US006285804B1

(12) United States Patent
Crinon et al.

(10) Patent No.: US 6,285,804 B1
(45) Date of Patent: Sep. 4, 2001

(54) RESOLUTION IMPROVEMENT FROM MULTIPLE IMAGES OF A SCENE CONTAINING MOTION AT FRACTIONAL PIXEL VALUES

(75) Inventors: Regis J. Crinon; Muhammed Ibrahim Sezan, both of Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/217,150

(22) Filed: Dec. 21, 1998

(51) Int. Cl.$^7$ ..................................................... G06K 9/32

(52) U.S. Cl. ............................................ 382/299; 348/699

(58) Field of Search ........................... 348/699; 382/299, 382/300, 236, 191, 107

(56) References Cited

U.S. PATENT DOCUMENTS

| 4,127,873 | 11/1978 | Katagi | 358/166 |
|---|---|---|---|
| 4,517,599 | 5/1985 | Zwirn et al. | 358/166 |
| 4,532,548 | 7/1985 | Zwirn | 358/166 |

(List continued on next page.)

FOREIGN PATENT DOCUMENTS

| WO 94/10653 | 5/1994 | (WO) . |
| WO 99/33024 | 7/1999 | (WO) . |

OTHER PUBLICATIONS

Berthold K.P. Horn and Brian G. Schunck, "Determining Optical Flow," *Artificial Intelligence Laboratory*, Massachusetts Institute of Technology, Cambrige, MA 02139, USA, 1981, pp. 185–203.

A. Murat Tekalp, Mehmet K. Ozkan, and M. Ibrahim Sezan, "High–Resolution Image Reconstruction From Lower–Resolution Image Sequences and Space–Varying Image Restoration," *IEEE International Conference on Acoustics, Speech and Signal Processing*, San Francisco, CA, vol. III, Mar. 1992, pp. 169–172.

J.L. Barron, D.J. Fleet, and S.S. Beauchemin, "Performance of Optical Flow Techniques," *International Journal of Computer Vision*, vol. 12, No. 1, 1994, pp. 43–77.

Jaakko Astola, Petri Haavisto, and Yrjo Neuvo, "Vector Median Filters," *Proceedings of the IEEE*, vol. 78, No. 4, Apr. 1990, pp. 678–689.

(List continued on next page.)

*Primary Examiner*—Yon J. Couso
(74) *Attorney, Agent, or Firm*—Marger Johnson & McCollom, P.C.

(57) ABSTRACT

A high-resolution image is derived from multiple low resolution images each having an array of low-resolution pixels. Motion vectors are derived at each of the unknown high-resolution grid points for each of the multiple low-resolution images. One motion vector is generated at each one of the high-resolution grid locations for each one of the multiple images. The motion vectors at the high-resolution grid points associate high-resolution grid points, whose values are unknown, with inter-pixel positions on the associated low-resolution images. Low-resolution pixels are identified that have the closest distance to each inter-pixel position. One or several of the identified low-resolution pixels having the shortest distance are used to determine the pixel value at each one of the high-resolution grid points. Pixel intensity values are then mapped into the high-resolution grid points according to the selected low-resolution pixels.

12 Claims, 6 Drawing Sheets

U.S. PATENT DOCUMENTS

| | | | |
|---|---|---|---|
| 4,760,469 | 7/1988 | Biber et al. | 358/310 |
| 5,231,502 | 7/1993 | Pfister | 358/213.11 |
| 5,231,519 | 7/1993 | Koike | 358/456 |
| 5,251,037 | 10/1993 | Busenberg | 358/213.28 |
| 5,341,174 * | 8/1994 | Xue et al. | 348/576 |
| 5,374,963 | 12/1994 | Willis | 348/564 |
| 5,442,394 | 8/1995 | Lee | 348/264 |
| 5,442,718 | 8/1995 | Kobayashi | 382/166 |
| 5,465,157 | 11/1995 | Seto et al. | 358/298 |
| 5,469,274 | 11/1995 | Iwasaki et al. | 358/450 |
| 5,550,935 | 8/1996 | Erdem et al. | 382/260 |
| 5,579,054 | 11/1996 | Sezan et al. | 348/452 |
| 5,579,445 | 11/1996 | Loce et al. | 395/102 |
| 5,579,451 | 11/1996 | Suzuki | 395/102 |
| 5,696,848 | 12/1997 | Patti et al. | 382/254 |
| 5,767,987 | 6/1998 | Wolff et al. | 358/447 |

OTHER PUBLICATIONS

M. Bierling, "Displacement Estimation by Hierarchical Blockmatching," *SPIE vol. 1001 Visual Communications and Image Processing*, 1988, pp. 942–951.

Sadik D. Bayrakeri and Russell M. Mersereau, "A New Method for Directional Image Interpolation," *Proceedings of the 1995 International Conference on Acoustics, Speech and Signal Processing*, 1995, pp. 2383–2386.

S. Mann and R.W. Picard, "Video Orbits of the Projective Group: A New Perspective on Image Mosaicking," *MIT Media Laboratory Technical Report No. 338*, 1995.

* cited by examiner

☐ = ORIGINAL SAMPLING GRID
✕ = NEW SAMPLES FROM IMAGE FRAME 16

RESOLUTION IMPROVEMENT FROM MULTIPLE IMAGES OF A SCENE CONTAINING MOTION AT FRACTIONAL PIXEL VALUES

BACKGROUND OF THE INVENTION

The invention relates to increasing the quality of high-resolution images and more particularly to increasing resolution at fractional pixel positions for a particular scene (called the reference image) by using multiple images of the scene.

Increasing the pixel resolution of an image beyond the resolution of the imaging sensor via digital postprocessing using multiple images provides valuable means of obtaining high quality images with cameras equipped with inexpensive low resolution sensors, or exceeding the physical capability of any given sensor and obtaining higher quality images.

Different single-image interpolation techniques are used to increase the amount of pixel information used to represent an image. Linear interpolation techniques do not increase the actual information content of an image but simply increase the number of pixels and lines in the image. Nonlinear interpolation techniques utilize a priori information about the image structure (e.g., direction of edges, and image object geometry) and in some instances, may provide better results than linear interpolation.

Referring to FIGS. 1 and 2, multiple images 16 of a scene are used to improve image resolution. The multiple images 16 may be individual shots acquired by a digital still camera, or successive frames/fields acquired by a video camera. New image information is contained in image samples 17 of the different images 16 that are inter-related by relative motion. This method is described in A. M. Tekalp, M. K. Ozkan and M. I. Sezan, *"High resolution Image Reconstruction from Lower-resolution image sequences and space-varying Image Restoration"*, IEEE International Conference on Acoustics, Speech and Signal Processing, San Francisco, Calif., Vol. III, March 1992, pages 169–172.

In this method, a reference image 12 is first chosen from the multiple images 16. Motion information includes a motion vector field 14 estimated from a low resolution image 16 onto the reference low resolution image 12. Each motion vector field 14 represents the relative displacement from image 16 onto the reference image 12. Image samples from image 16 are mapped onto the reference image 12 to create a high-resolution image 19 using the motion vectors 14. Image 19 is a high resolution version of the scene captured in the reference image 12. New image samples derived from the other low-resolution images 16 are shown by "x" in the high resolution image 19.

The low-resolution reference image 12 may not be able to capture image detail faithfully, such as image detail 10 in the neighborhood of the low-resolution pixel samples 17 in the reference image 12. This inability to represent detail is a direct consequence of the Nyquist Theorem for one and multi-dimensional sampled signals which states that any detail being at a frequency equal or higher than half the sampling rate cannot be faithfully represented in image 12. However, due to camera motion while electronically capturing the images 16 or motion in the image taken by the camera at different times, image detail 10 might be re-constructed unambiguously through the additional image information revealed in one or several of the low-resolution images 16. The high-resolution image 19 uses the low-resolution samples 17 from the other images 16 to re-construct the additional image details 10.

Referring to FIG. 2, intersection of dashed lines 18 indicate locations of the additional sampling grid points 20 (pixels) that are used to increase the resolution in reference image 12 beyond its current resolution level identified by squares 17. As depicted in FIG. 2, the samples x from the other low resolution images 16 are mapped, in general, to arbitrary inter-pixel locations that do not coincide with any high-resolution inter-pixel location 20. Sample locations 20 constitute a uniform high resolution sampling grid. Producing new samples at these locations is the ultimate goal of any resolution improvement technique since all image display devices operate on the basis of a uniform sampling grid. The original low-resolution samples 17 and the new samples x constitute samples of the higher resolution image over a non-uniform sampling grid.

A very complex interpolation process is required to derive pixel values for the high-resolution image 19 at uniform grid locations 20 from the non-uniformly located samples x. For example, multiple samples 21 must be concurrently used by a multi-dimensional digital filter to generate the pixel value at the high-resolution grid point 20A. Typically, samples at grid locations 20 cannot capture maximum image details due to limitations in the size of the digital filters used for interpolating the samples x to the location 20A. In addition, there is also no guarantee that there be any samples x in the region of support of the digital interpolation filter and as a result, no further image quality can be produced when this occurs.

Accordingly, a need remains for producing high-resolution images by using samples taken from other images while increasing the quality of the high-resolution image and reducing the complexity of the process used to generate the high-resolution image.

SUMMARY OF THE INVENTION

A high-resolution image is derived from multiple low resolution images each having an array of low-resolution pixels. The low resolution images provide low resolution representations of a scene at different phases. Phase differences are due to the fractional pixel motion of image content in time. Motion is either induced by the camera operator purposely (panning or zooming) or in an uncontrolled fashion (free motion of the camera operator's hand). Motion can also be mechanically induced in the optical apparatus of the camera. Motion vectors are derived at each unknown high-resolution grid point. These motion vectors are either derived from an estimated motion vector field or from a motion model for which the parameters have been estimated or made available in some other way (see detailed description of the invention). Consequently, one motion vector is generated at each one of the high-resolution grid locations and for each one of the multiple low-resolution images. Motion vectors emerge from the reference image and point at the low resolution images.

The motion vectors map the unknown high-resolution sampling grid points to inter-pixel positions on the associated low-resolution images. For each low resolution image, low-resolution pixels are identified that have the closest distance to each inter-pixel position. One or several of the identified low-resolution pixels having a shortest distance is selected at each to one of the high-resolution grid points. Pixel intensity values are then mapped back into the high-resolution grid points according to the selected low-resolution pixels.

Mapping the pixel intensity values back to the high resolution grid points in the reference image comprises interpolating the sample value at the inter-pixel position from the selected low-resolution pixels using possibly, the associated motion vectors or motion parameters. Alternatively, mapping the pixel intensity values comprises directly mapping the values of the selected low-resolution pixels back as the pixel value at the high- resolution grid locations.

In another embodiment of the invention, a distance threshold value is selected. A spatial smart interpolation or an edge adaptive interpolation is used to derive pixel values at the high-resolution grid locations that have no pixels with distances less than the distance threshold value.

The foregoing and other objects, features and advantages of the invention will become more readily apparent from the following detailed description of a preferred embodiment of the invention, which proceeds with reference to the accompanying drawings.

DETAILED DESCRIPTION

Figure 1:
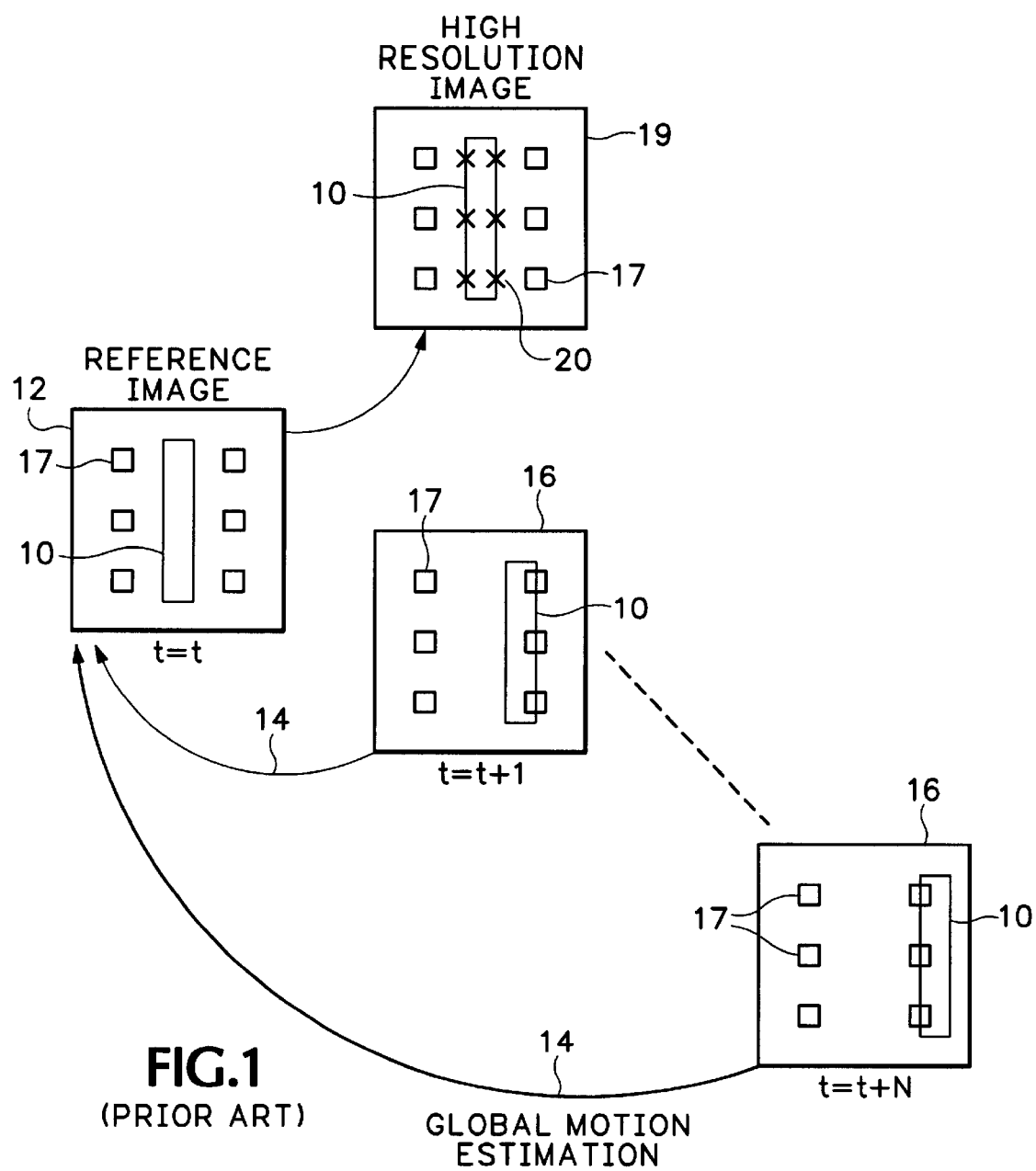
FIG. 1 is a prior art schematic diagram showing how motion vectors associated with other images are mapped back to a reference image.
Figure 2:
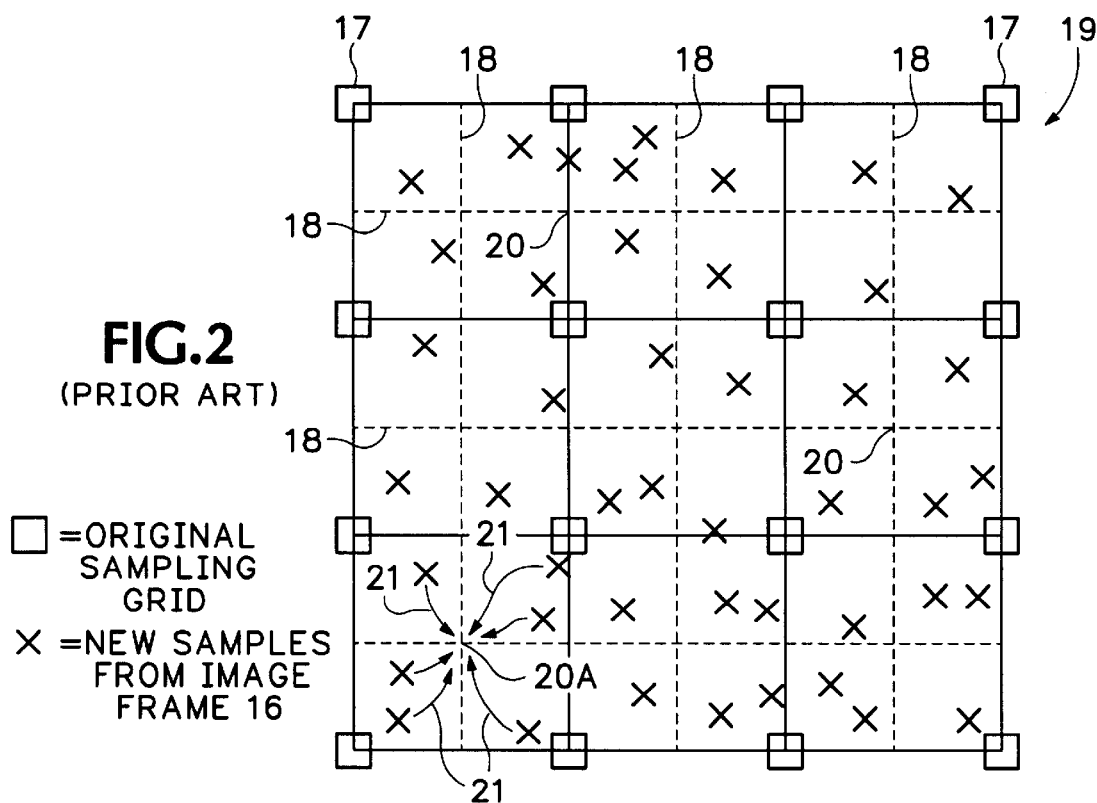
FIG. 2 is a prior art schematic diagram of a non-uniform interpolation technique used for mapping samples from the other images onto the reference image.
Figure 3:
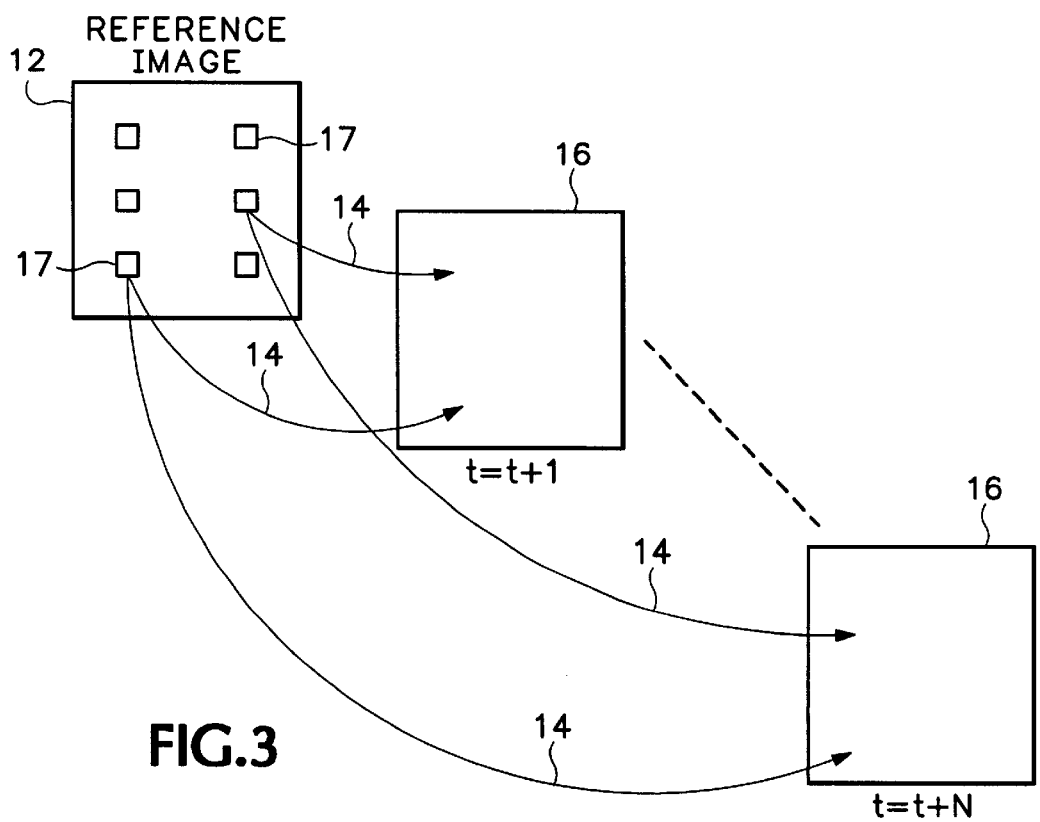
FIG. 3 is a schematic diagram according to the invention showing how motion vectors corresponding to inter-pixel locations in the reference image are used to point to pixel locations in the other images.
Figure 4:
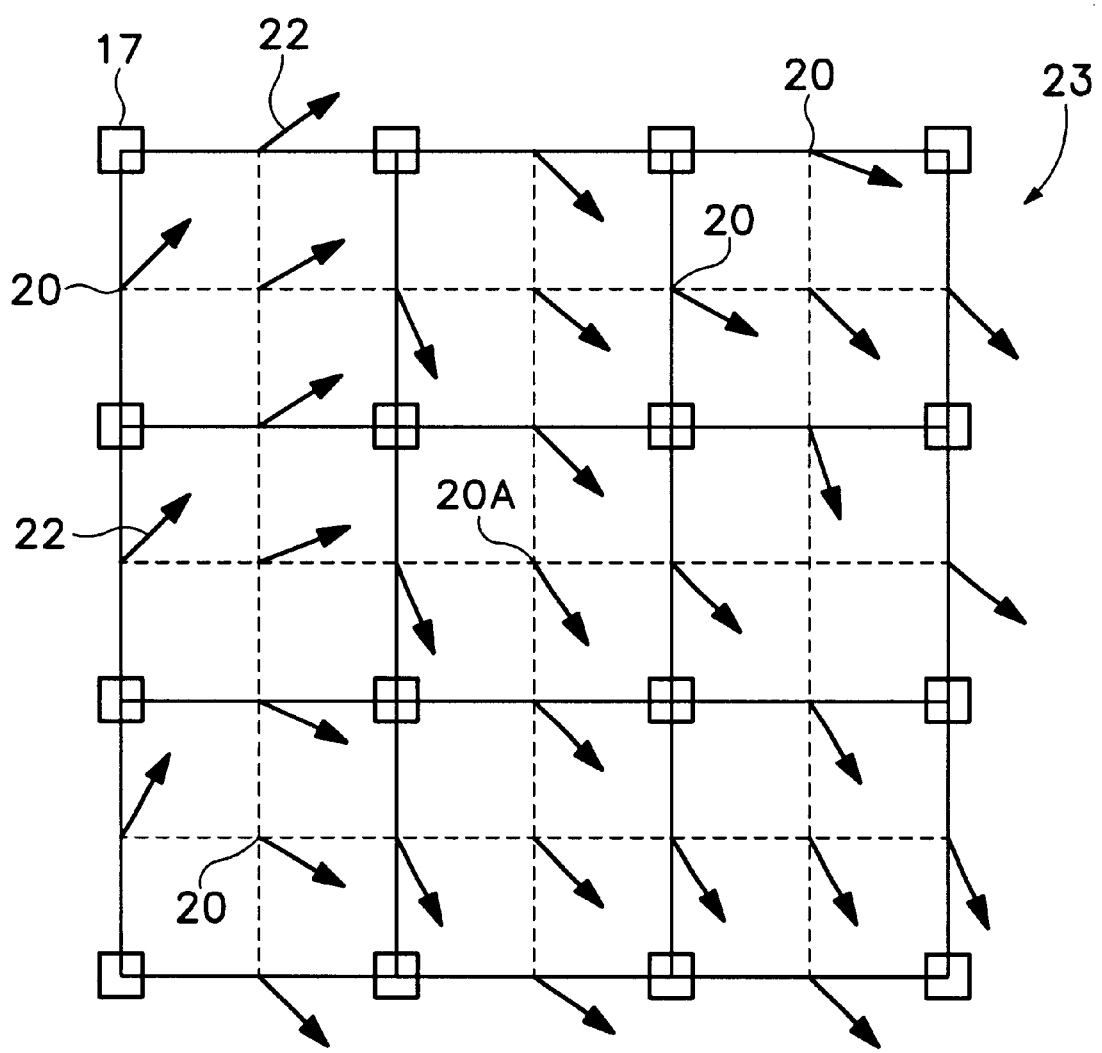
FIGS. 4 and 5 are schematic diagrams showing how pixel intensity values are determined for high-resolution gridpoints.

Referring to FIGS. 3–4, instead of mapping samples from each image 16 back to the reference image 12, motion vectors 22 associated with each high-resolution grid point 20, are used to map the high resolution grid point 20 onto the other low resolution images 16. The low resolution image sample located nearest (according to some pre-defined distance measure) to the inter-pixel position pointed by one of the motion vectors is identified and used to generate an image intensity value at the high-resolution grid locations 20. It is possible that several (as opposed to one) "nearest" low resolution image samples be kept for the purpose of calculating the image intensity at each high-resolution grid location 20. The motion vectors 22 at high-resolution grid points 20 are estimated in step 30 of FIG. 6. In one embodiment, motion vectors 22 are derived from a parametric global motion model such as a translational, affine or a perspective model requiring two, six and eight parameters, respectively. The global motion model parameters are estimated using the low resolution reference image 12 and another low resolution image 16. A motion model is estimated between the reference image 12 and each other low resolution image 16. Alternatively, the global motion parameters may be supplied directly from an auxiliary mechanical/optical apparatus in the camera. Once the global motion parameters are available, the global motion model is subsequently used to determine a pixel displacement vector 22 at each high resolution sample location 20 in image 23.

Figure 5:
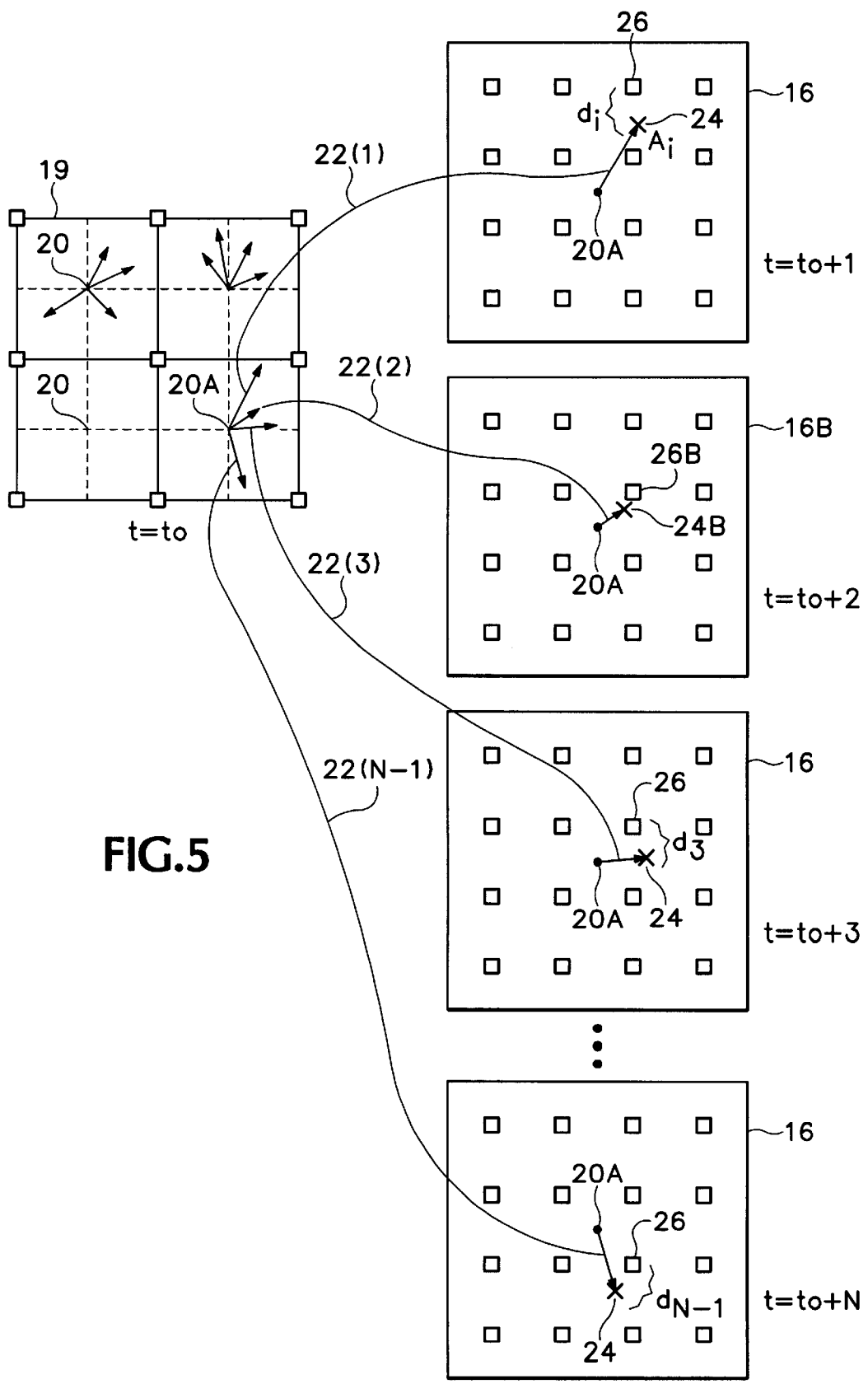

More specifically, every inter-pixel position 20 in the reference image 12 has displacement vectors 22 pointing at arbitrary pixel or inter-pixel locations in the other low resolution images 16. If there are N images 16, N−1 vectors 22 are estimated for each inter-pixel position 20. The invention maps back the corresponding pixel intensity values in the other low resolution images 16 to high-resolution grid points 20 in a high-resolution image 19 (FIG. 5).

The novel mapping technique produces new image intensity values at the unknown high-resolution grid locations 20 while reducing the computational complexity required to map values from the other images back to the high-resolution image and subsequently performing a nonuniform interpolation. The effect of the mapping is to re-construct unambiguous (non-aliased) image detail in the vicinity of each new high resolution sampling grid location 20 and low resolution sample 17. Note that a low count of low resolution images may result in using the same low resolution image sample multiple times.

In an alternative embodiment, displacement vectors 22 are estimated for each unknown high-resolution grid point 20 using the pixel motion information 14 for the original pixels 17 in the reference image 12, where pixel motion information describes motion between the reference frame 12 and other low resolution images 16. In this case, the pixel motion information can be estimated using well-known optical flow techniques, such as those discussed in J. L. Barron, D. J. Fleet, and S. S. Beauchemin, "*Performance of Optical Flow Techniques,* " International Journal of Computer Vision, Vol. 12, No. 1, 1994, pages 43–77, and in B. K. P. Horn and B. G. Schunck, "*Determining Optical Flow,*" Artificial Intelligence, Vol. 17, 1981, pages 185–203, which is incorporated by reference. In this case, the motion vectors 22 are estimated from neighboring motion vectors estimated for the original pixels 17, using a multi-channel interpolation filter.

An example of a multi-channel interpolation filter for estimating motion vectors 22 from a set of neighboring motion vectors 17 is the Vector Median Filter. The Vector Median Filter is defined by J. Astola, P. Haavisto, Y. Neuvo, "*Vector Median Filters*", Proceedings of the IEEE, Vol. 78, No. 4, April 1990, pages 678–689.

A Vector Median Filter has the property of identifying the most representative vector from a finite set of input vectors. The identification of such vector is done by minimizing the distance from a vector to all the other vectors in the set. For example, consider three two-dimensional motion vectors taking the following values: [1,2], [3,5] and [2,10]. Using the sum of the component absolute differences as a distance metric, it can be calculated that the distance from the first vector to the second and third vector is equal to 14, the distance from the second to the first and third vector is equal to 11 and the distance from the third vector to the first and second vector is equal to 15.

The output of the Vector Median Filter is in this case the vector [3,5] because it is the losest to the other two vectors (11 is the minimum distance among 14,11 and 15). The motion estimation vectors at the low-resolution grid points 17 are estimated using a known optical flow field, or block matching-based motion estimation method as given in M. 167 Bierling, "*Displacement Estimation by Hierarchical Block Matching,*" SPIE Vol. 1001 Visual Communications and Image Processing, 1988, pages 942–951, which is incorporated by reference.

Yet in another embodiment, a set of local parametric models can be derived from the motion vectors 14 describing the motion of the low-resolution pixels 17 in the vicinity of the high-resolution grid. In this particular case, the model parameters may vary from one high-resolution sample value to another. The size of the pixel neighborhood used to estimate the model parameters depends on the order of the model. For example, given the fact that the local motion models are affine motion models, a finite count (at least six) of low-resolution pixel correspondences in the vicinity of each high resolution grid point 20 is used to estimate the parameters of each affine model. The local motion model is then used to derive a displacement vector at the high resolution grid 20. These techniques describe above are well known to those skilled in the art and are therefore not described in further detail. Once, the motion vectors 22 associated with the high-resolution grid locations 20 are estimated, the intensity values from the other images 16 obtained using the motion vectors 22 are mapped back onto the high-resolution grid points 20.

Figure 6:
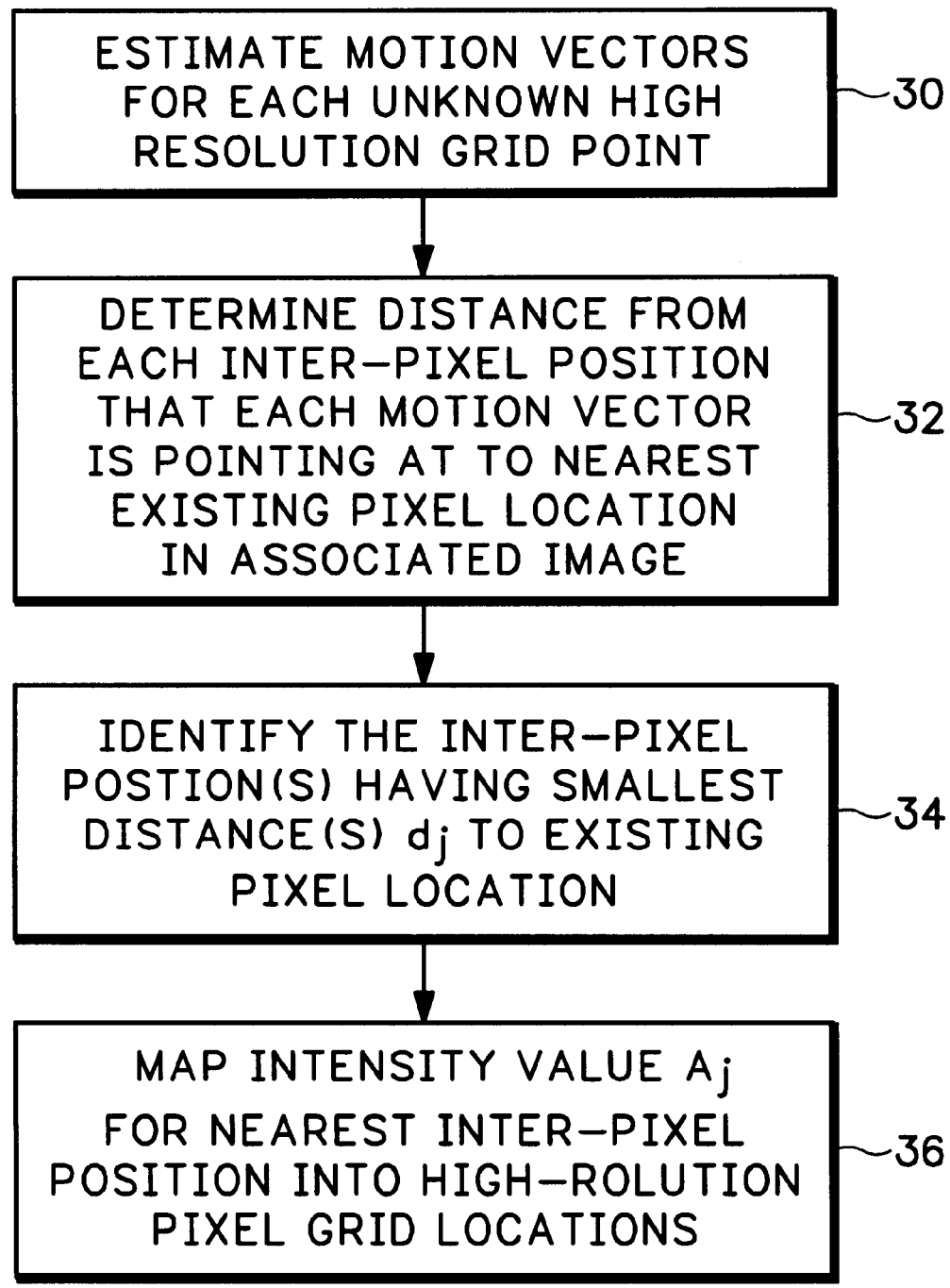
FIG. 6 is a flow diagram further showing how unknown intensity values are determined.

Referring to FIGS. 5 and 6, there are N−1 motion vectors 22(1)-22(N−1) associated with each one of the high-resolution grid points 20 in the reference image 19. Each motion vector 22 points to an associated one of the other N−1 images 16 and is estimated in step 30. Consequently, there are N−1 intensity value choices for each high-resolution grid point 20. Different selection criteria are used for selecting the best or a set of best intensity values for mapping into each high-resolution grid point 20.

Inter-pixel positions 24 are located on each one of the images 16 for each N−1 inter-pixel position 24 that the vectors 22 point at. A distance is determined to the nearest integer pixel position 26 (i.e., existing low-resolution pixel sample) in step 32. A pair (Ai, di) is derived for each one of the N−1 inter-pixel positions 24 for each high-resolution grid point 20. The value Ai is the intensity value obtained by spatial interpolation at the inter-pixel position 24. The value di is the distance between the nearest pixel position 26 and the inter-pixel position 24. Spatial interpolation is well known to those skilled in the art. Nearest-neighbor spatial interpolation, for example, will produce the value at 26 at the inter-pixel position 24. Bilinear spatial interpolation, for example, will utilize the four nearest pixel values, including the pixel value at 26, to interpolate the value at inter-pixel position 24. A value Aj having the smallest distance, dj, is determined in step 34, and it is subsequently mapped into the high-resolution pixel location 20 in step 36. Note that in step 34 several of the closest pixels (as opposed to the closest only) could be used. In this case, the interpolation process makes use of the associated distance values to calculate the sample value at the high resolution grid point 20. For example, each distance value can be used to determine a weighting factor specifying the contribution of the associated sample value in the final image sample value at grid point 20. For example, in FIG. 5, the motion vector 22(2) mapped to the image 16B at time t=t0+2 has an inter-pixel position 24B closest to the existing pixel position 26B. The distance di between position 24B and 26B is the smallest distance for any one of the motion vectors 22 at high-resolution point 20A. The pixel intensity value for grid location 20A is derived using spatial interpolation.

The example shown in FIGS. 5 and 6 is for a resolution improvement of 2× but can be any arbitrary integer or rational value. If resolution improvement is 4×, for example, at least sixteen other images are typically used for best results. As described above, motion vectors 22 can be produced by a parametric motion model whose parameters are estimated via optical flow estimation or via hierarchical block matching with fractional pixel refinement. Parametric motion models include affine and perspective models and are especially useful when image motion is only due to camera motion.

Figure 7:
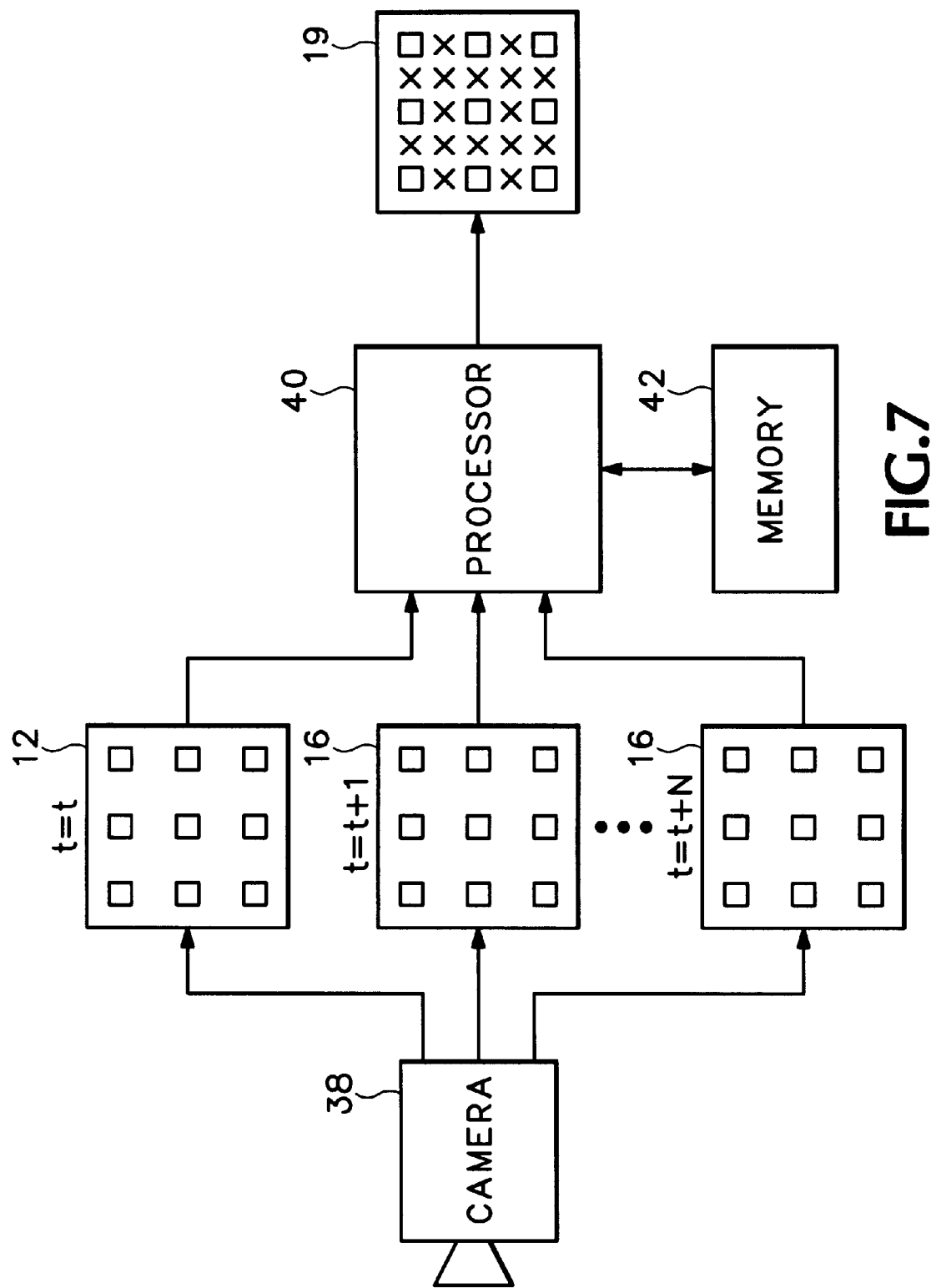
FIG. 7 is a block diagram showing a system for producing the high-resolution images.

FIG. 7 is a block diagram showing the system used for generating the high-resolution image 23. A camera 38 takes multiple low-resolution images 16 of a scene. One of the images 16 is designated as the reference image 12. A processor 40 receives and stores the multiple images 16 into memory 42. The processor 40 performs the mapping of the low-resolution samples in images 16 into the reference image 12 as described above to generate the high-resolution image 19. The mapping technique is typically implemented in software loaded in processor 40 but a hardware implementation is also possible without deviating from the scope of the invention.

Other variations of this technique are possible. The pairs (Ai,di) and the smallest 40 distance dj are identified. If dj is greater than a threshold value, T, then temporal processing (using images 16 taken at other instances in time) is not used for that particular high-resolution grid point 20. The value of the grid point 20 is then determined using smart spatial interpolation. For example an edge-adaptive interpolation method, such as the one proposed in S. D. Bayrakeri and R. M. Mersereau, "A New Method for Directional Image Interpolation," Proceedings of 1995 International Conference on Acoustics, Speech and Signal Processing, 1995, pages 2383–2386, may be used, which is incorporated by reference.

In the motion vector derivation described above, an additional criterion can be introduced to test the accuracy of the motion correspondence. Although the motion vector 22 may point closely to a pixel location 26 (FIG. 5), the vector may be inaccurate due to occlusions. Such occlusions occur for example when a global motion parameter is used to estimate motion vectors 22 and there is a foreground object over the background scene which does not move according to the global motion model. To monitor the occurrence of such cases, a local motion compensation error is computed, based on the sum of image sample absolute difference computed over a block of neighboring image pixels 17 in the referenced image 12 and the vicinity of the target position in the selected low resolution image(s) 16. This can be implemented as a temporal high-pass filter involving the low resolution pixel values surrounding the high resolution grid point and the low resolution pixel values surrounding the target position. A high error value indicates the motion estimate may be inaccurate. In that case, the algorithm falls back to smart spatial interpolation. There are other possible ways of designing this additional accuracy criterion that make the high-resolution mapping described above robust in presence of motion estimation errors.

Instead of mapping back the value Aj, which is determined using spatial interpolation (e.g., bilinear), the value of the nearest pixel is directly mapped back (i.e., copied) to the associated high-resolution location 20, i.e., implementing nearest-neighbor spatial interpolation.

A raw Charged Couple Device (CCD) output can be used especially when the CCD employs a color filter array (CFA). If this pattern is known, RGB values (called "raw CCD output") are used directly (over a sparse set of grid points) before these color values are filtered to interpolate the image to full RGB resolution. In that case, each color channel is independently processed as described above. The motion estimation process, however, may be performed on one of the color fields only (typically the green field). An alternative is to perform motion estimation in the luminance channel (that is, a linear or non-linear combination of the red, green and blue channels) and then use it in processing the RGB channels.

An important application of the invention is for obtaining high-resolution document images by moving a camera to acquire multiple images and subsequently map their content to a higher resolution image. It is possible to further increase the visual quality of the improved resolution image by post-filtering. For instance, a Wiener filter with Gaussian blur point spread function can be applied to improve image sharpness if the image is slightly blurred due to sen so r integration.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for generating a high-resolution image having an array of proportionally spaced high-resolution grid points derived from multiple low resolution images each having an array of low resolution pixels, comprising:

deriving motion vectors that each originate from the proportionally spaced high-resolution grid points in the high-resolution image, the motion vectors each associated with one of the multiple low resolution images;

associating the high-resolution grid points with inter-pixel positions on the associated low-resolution images using the motion vectors;

identifying one or more of the low-resolution pixels on each one of the low-resolution images having the closest spatial distance to the inter-pixel positions;

selecting one or more of the identified low-resolution pixels for each one of the high-resolution grid points having a shortest distance; and mapping pixel intensity values into the high-resolution grid points according to the selected low-resolution pixels.

2. A method according to claim 1 wherein mapping the pixel intensity values comprises interpolating the intensity sample values at the mapped inter-pixel positions from the neighboring low-resolution pixels.

3. A method according to claim 1 wherein mapping the pixel intensity values comprise mapping the intensity values of the pixel closest to the mapped inter-pixel positions directly back as the pixel value at the high-resolution grid locations.

4. A method according to claim 1 wherein the motion vectors at the high-resolution grid points are estimated according to one of the following:

using a median vector value of neighboring motion vectors for existing low-resolution pixels;

using a motion model, such as a translational, an affine or a perspective model;

fitting the motion model to pixel motion information belonging to the low-resolution pixels surrounding the high-resolution grid points; and estimating the motion vectors at the high resolution grid points from the motion model.

5. A method according to claim 4 including generating one motion vector at each one of the high-resolution grid locations for each one of the multiple low-resolution images.

6. A method according to claim 5 including the following:

selecting a distance threshold value; and using a spatial and/or temporal smart interpolation or an edge adaptive interpolation for deriving pixel values at the high-resolution grid locations when the pixel having the shortest distance to the mapped inter-pixel position is greater than the distance threshold value.

7. A method according to claim 5 including computing a local motion compensation error at every high resolution sampling grid point according to a sum of sample intensity differences of pixel values in the low resolution reference image and in the low resolution target image and using a spatial and/or temporal smart interpolation or an edge adaptive interpolation for deriving pixel values at the high-resolution grid locations when the motion compensation error is high.

8. A method according to claim 5 including the following:

generating multiple color channels for each of the multiple images; and mapping the pixel intensity values for the high-resolution grid locations according to a common motion estimation model derived from one or several color channels or luminance.

9. A system for generating a high-resolution image, comprising:

a processor receiving multiple low-resolution images each having an associated motion information field that identifies relative motion occurring while generating the multiple low-resolution images; and the processor generating a high-resolution image from pixels in the multiple low resolution images by mapping motion vectors originating from the high-resolution grid points in the high-resolution image to inter-pixel locations in the low-resolution images and identifying which of the pixels in the multiple low-resolution images are most closely located to the inter-pixel locations and then mapping image intensity values into the high-resolution grid points according to the identified pixels in the low-resolution images.

10. A system according to claim 9 wherein the processor selectively varies a resolution factor of the high-resolution image, the processor varying the number of low-resolution images used for generating the high-resolution image according to the resolution factor.

11. A system according to claim 9 including deriving a median motion vector at each high-resolution grid point for each one of the low-resolution images by taking a vector median of motion vectors at existing low-resolution pixel locations in a reference one of the multiple low-resolution images.

12. A system according to claim 9 wherein the processor locates the pixel in each of the low-resolution images that is located closest to the inter-pixel locations and selects one or several of the located pixels that have the shortest distances to the inter-pixel locations for generating the pixel values at the high-resolution grid points.

* * * * *

UNITED STATES PATENT AND TRADEMARK OFFICE
CERTIFICATE OF CORRECTION

PATENT NO.     : 6,285,804 B1
DATED          : September 4, 2001
INVENTOR(S)    : Crinon et al.

It is certified that error appears in the above-identified patent and that said Letters Patent is hereby corrected as shown below:

Column 2,
Line 62, "at each to one" should read -- at each one --.

Column 4,
Line 62, "M. 167 Bierling" should read -- M. Bierling --.

Column 6,
Line 17, "smallest 40 distance" should read -- smallest distance --.

Column 7,
Line 11, "sen so r" should read -- sensor --.

Signed and Sealed this

First Day of April, 2003

JAMES E. ROGAN
*Director of the United States Patent and Trademark Office*